(12) United States Patent
Barbeau

(10) Patent No.: US 9,656,817 B2
(45) Date of Patent: May 23, 2017

(54) IN-CAB READY SIGNAL SENSING SYSTEM

(71) Applicant: Christopher Barbeau, Mooresville, NC (US)

(72) Inventor: Christopher Barbeau, Mooresville, NC (US)

( * ) Notice: Subject to any disclaimer, the term of this patent is extended or adjusted under 35 U.S.C. 154(b) by 0 days.

(21) Appl. No.: 14/554,136

(22) Filed: Nov. 26, 2014

(65) Prior Publication Data

US 2015/0145697 A1    May 28, 2015

Related U.S. Application Data

(60) Provisional application No. 61/908,901, filed on Nov. 26, 2013.

(51) Int. Cl.
| | | |
|---|---|---|
| *G08G 1/095* | (2006.01) |
| *B65G 69/28* | (2006.01) |
| *G08G 1/096* | (2006.01) |
| *G08G 1/09* | (2006.01) |
| *G08G 1/0967* | (2006.01) |

(52) U.S. Cl.
CPC ......... *B65G 69/2882* (2013.01); *G08G 1/096* (2013.01); *G08G 1/09* (2013.01); *G08G 1/096716* (2013.01)

(58) Field of Classification Search
CPC .......... G08G 1/096; G08G 1/095; G08G 1/09; G08G 9/096716; G08G 1/096758; G08G 1/096783
See application file for complete search history.

(56) References Cited

U.S. PATENT DOCUMENTS 6,707,391 B1 *    3/2004    Monroe ............... G08G 1/0965
                                                              340/901
2011/0226935 A1 *  9/2011    Kawahito ......... H01L 27/14603
                                                              250/208.1

* cited by examiner

*Primary Examiner* — Hongmin Fan
(74) *Attorney, Agent, or Firm* — Trego, Hines & Ladenheim, PLLC; Thomas McClure

(57) ABSTRACT

The present invention provides a system for indicating the status of a loading dock to a driver. The system includes a signal detector configured to provide an indication to an operator when a signal generator is in a predetermined state. In one embodiment, the signal generator is configured to emit light when it is safe to leave the loading dock and the signal detector is configured to detect light. An operator interface is electrically connected to the signal detector. The operator interface is configured to convey to the operator the status determined by the signal detector. The signal detector is associated with a vehicle and the signal detector is adaptable to a plurality of signal generators.

4 Claims, 3 Drawing Sheets

IN-CAB READY SIGNAL SENSING SYSTEM

FIELD OF THE INVENTION

The invention relates generally to a system for alerting a truck driver when it is safe to pull away from a loading dock and more specifically to a system and device for monitoring loading dock signal lights wherein the system and device is movable with an associated vehicle.

BACKGROUND OF THE INVENTION

Conventionally, tractor trailer trucks are loaded and unloaded at loading docks. While at the dock the following occurs: the trailer door is opened, goods are transferred into trailer, goods are transferred out of the trailer, and the trailer is entered for inspection of it and its contents. Generally, the goods are transferred using a fork lift or the like, and inspection is accomplished by a person who enters the trailer on foot or on a vehicle. In order to ensure that the trailer remains safely engaged with the loading dock, it is known to provide a signal to the driver indicating that the truck is not to be moved. Such a signal is often conveyed via a light of a predetermined color. Conventionally, the light color associated with not moving the trailer is red and the color associated with moving the trailer is green. It is also known to mechanically tie or fix a trailer to a loading dock. Further safety measures include blocking or chocking the tractor and trailer wheels such that movement of the trailer is impeded.

In order to efficiently utilize loading dock space and a driver's time, it is desirable for a driver to move a tractor trailer rig from a loading dock shortly after it is safe to do so. A conventional method for indicating to the driver when it is safe to do so is to provide a signal light of a predetermined color that indicates when it is safe to remove the truck from the loading dock. Such a signal is often a green light.

One problem with such systems is that the driver must be observing the signal light or lights in order to determine when it is safe to leave. Observing the signal light requires at least two things: that the driver be in a position to visually see the light and that the driver be awake. It often takes a long time to load or unload a truck at a loading dock. Therefore, it is difficult to anticipate when the truck can safely pull away from the dock because the duration of a trucks stay at a loading dock varies. The variation in duration depends on a variety of things including procedures used at the facility, the type of load, and the like.

Due to regulations and safety practices, drivers are also limited in the number of hours that they can drive without breaks. For a break to be effective and promote safety, the driver should be able to sleep, nap, and attend to personal tasks. Drivers are often instructed to leave the dock as soon as possible by the trucking company or the dock facility. Effective breaks are not possible if the driver must continually maintain visual contact with the dock signal lights.

A conventional solution to this problem that is employed at some docks is to provide audible alarms indicating a safe to leave condition, i.e. a green light, in the cab. However not all facilities include such systems and not all trucks are configured to work with a particular system at a particular facility even if the facility does have such a system.

One problem with current loading dock and truck configurations is that drivers are not able to utilize their time for resting when they are waiting for an all clear signal.

Another problem with conventional loading dock configurations is that incab signaling systems are not available to all truck operators.

Another problem is that substantial vigilance is required by a truck driver in order to efficiently utilize the time available after loading or unloading a truck.

Another problem with conventional loading dock signals is that they do not provide for driver choice, with regards to where or how the signal is observed.

It is believed that another problem with conventional loading dock signals is that the type available is determined by the loading dock operators.

Another problem with conventional loading dock in-cab signal systems is that they are not useful at loading docks that have only a signal light system.

SUMMARY OF THE INVENTION

The present invention provides a system for determining loading dock status based on signal lights provided at the dock and for conveying information regarding the loading dock status to a driver. More specifically, the present invention provides a light detector configured to generate a signal that corresponds to the state of the light, a receiver for receiving the signal generated by the light detector, a data processer, and a driver interface.

The present invention provides a system configured to be used by a driver to determine the status of a signal light where the signal light dimensions and light output is not the same at all loading docks.

The problem of a driver determining when it is safe to leave a loading dock that is not equipped for audible or in-cab signaling while the driver is not looking at a dock signal light is solved by providing a system for detecting the safe to leave signal and providing an indication of the signal to the driver even when the driver is in the sleeping compartment of the cab wherein the system includes a light detector that can be used to detect okay to leave signals as indicated by a light.

According to one embodiment of the present invention, there is provided a signal detector that is configured to communicate information related to the signal to an operator interface.

According to one aspect of the present invention, the signal detector is electrically connected to a data processer.

According to another aspect of the present invention, the data processer determines the status indicated by the signal light.

According to another aspect of the present invention, the determination of status made by the data processor is based on the information communicated from the signal detector.

According to another aspect of the present invention, the signal detector is configured to generate an audible tone that corresponds to a safe to leave signal generated by a light.

According to another aspect of the present invention, the signal detector is a photoelectric cell.

According to another aspect of the present invention, the photo-electric cell is deployable by positioning it near a predetermined signal light.

According to another aspect of the present invention, the signal light is steady.

According to another aspect of the present invention, the signal light blinks or flashes.

BRIEF DESCRIPTION OF THE DRAWINGS

For a fuller understanding of the nature and objects of the present invention, reference should be made to the following detailed description taken in connection with the accompanying drawings, wherein.

DETAILED DESCRIPTION OF THE PREFERRED EMBODIMENTS

Embodiments of the present invention are directed to a system 10 for determining the status of a loading dock light and providing an indication to a driver of that status. System 10 is configured to be used and transported on a predetermined tractor such that system 10 can be deployed on more than one different loading dock signal light. In this manner, there is provided system 10 for allowing a driver to determine when it is safe to leave a loading dock in a manner that the driver chooses such as via an audible alarm generated by system 10.

Figure 2:
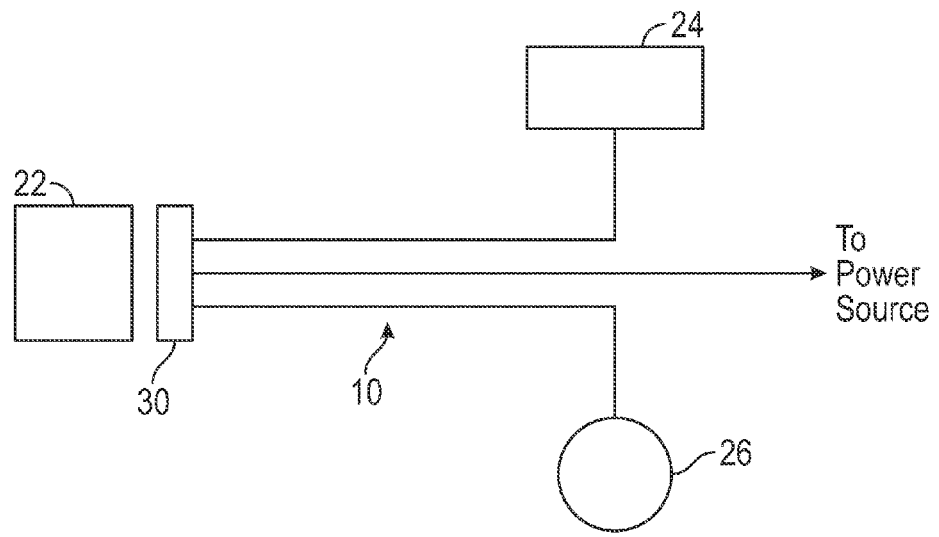
FIG. 2 is a schematic representation of a system for determining the status of a loading dock ready-light according to one embodiment of the present invention.

Referring to FIG. 2, in accordance with an embodiment of the invention, a system 10 for detecting a ready signal at a loading dock includes a detector 30, an operator interface 24, and an indicator 26. Detector 30 is configured to detect whether or not a light source is emitting light, i.e. whether the light source is off or on. In another embodiment, detector 30 is configured to determine what color of light is being emitted from a light source. Signal detector 30 is electrically connected to Operator interface 24 and interface 24 is electrically connected to indicator 26. In one embodiment, operator interface 24 is wirelessly connected to signal detector 30 by radio waves, infrared, or other wireless mode of communication.

Figure 3:
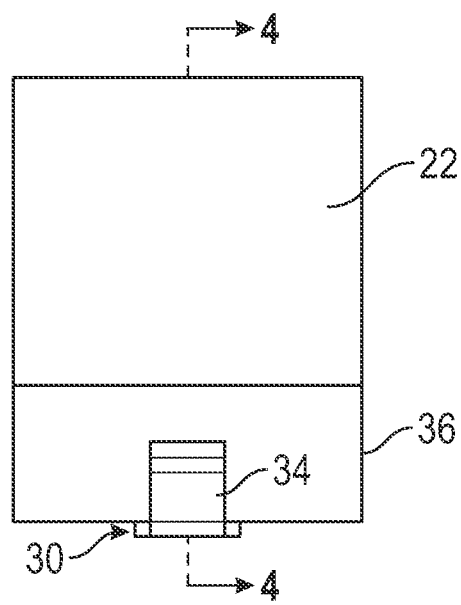
FIG. 3 is a top view of a signal detector attached to a signal generator, a light, according to one embodiment of the present invention.
Figure 4:
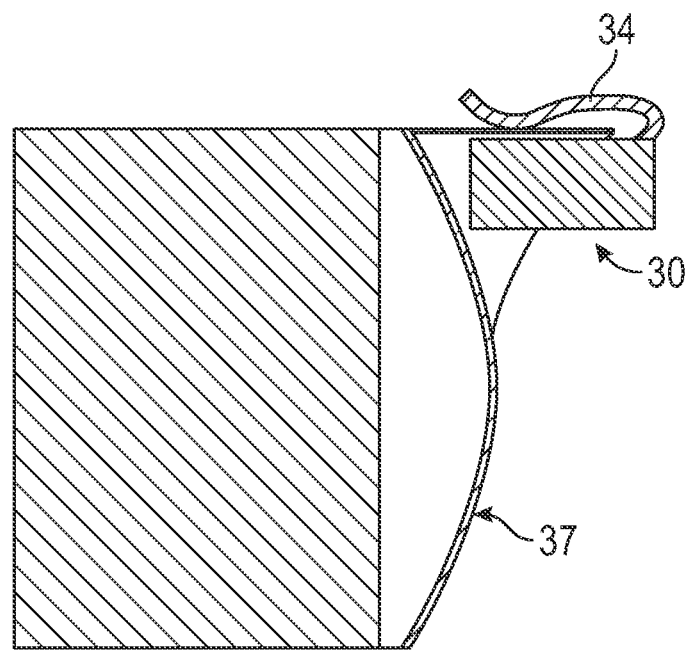
FIG. 4 is a cutaway side view of a signal detector attached to a signal generator, a light, according to one embodiment of the present invention taken along line 4-4 as shown in FIG. 3.

Referring now to FIGS. 3 and 4, detector 30 includes a housing 32 and a clip 34. Clip 34 is an attachment device that provides for positioning detector 30 in close proximity with a ready signal 22. As shown, clip 34 is configured to engage with a portion of signal 22 such as extended shelter 36 such that detector 30 is positioned to sense the status of signal 22. In the illustrated embodiment sensor 30 is positioned in close proximity to a lens 37 of ready signal 22.

Figure 5:
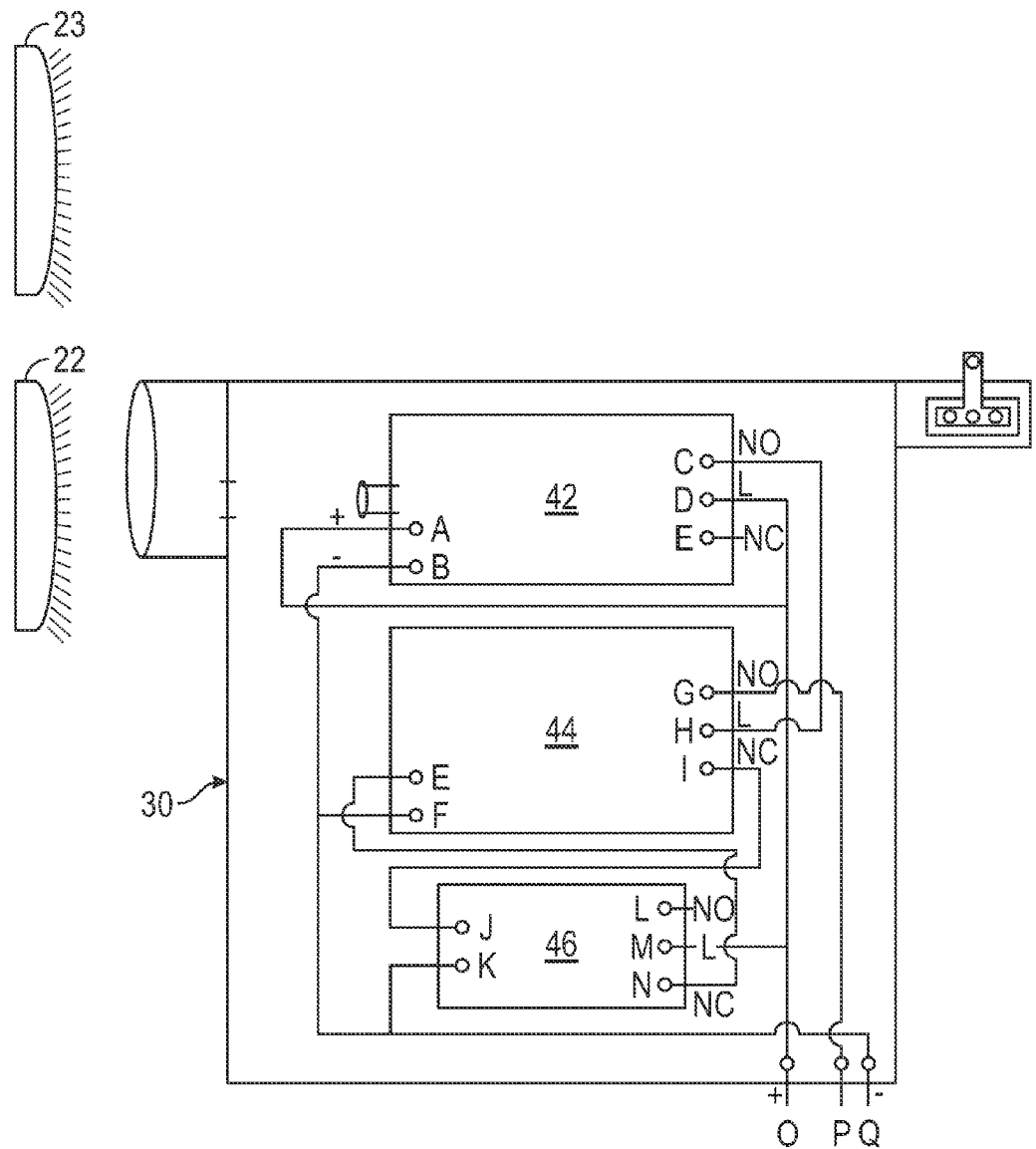
FIG. 5 is a schematic view of a detector attached to a light in accordance with one embodiment of the present invention.

As shown in FIG. 5, detector 30 includes a sensor switch 42, a delay 44 and a relay 46. Sensor switch 42 is configured to detect the presence or absence of light according to predetermined parameters of quantity of light. For example, when switch 42 is exposed to light below a predetermined amount of lumens, switch 42 indicates that no light is present and when switch 42 is exposed to light at or above a predetermined amount of lumens, switch 42 generates a signal indicating that light is present. Delay 44 is configured to detect the signal generated by switch 42. Delay 44 is configured such that relay 46 and thus detector 30 emits a signal to interface 24 when the signal from switch 42 is present for a predetermined duration. By way of example and not limitation, in other embodiments sensor switch 42 is configured to generate a signal in accordance with color, frequency of blinks or on/off cycles of light, pattern of a sequence of blinks of varying duration, and a combination thereof.

In one embodiment, operator interface 24 and indicator 26 are included in the same housing. Operator interface 24 is configured to receive input from the driver such that system 10 can be controlled. By way of example and not limitation, operations such as activating system 10, resetting detector 30, selecting the type of output generated by indicator 26, deactivating system 10, acknowledging indicator 26, and a combination thereof.

According to the illustrated embodiment, indicator 26 is configured to output sound and is thus an audible alarm. It should be appreciated that, by way of example and not limitation, indicator 26 can be configured to output a visual indications including text and color, vibrations, sound, electrical signals to other devices such as a cell phone, and a combination thereof.

According to the illustrated embodiment, ready signal 22 configured to generate a a green signal light is configured to indicate that the dock is safe to enter or to leave bay 2. Correspondingly, an unsafe condition signal 23 is configured to indicate that it is not safe for a truck to enter or leave an associated loading bay. In the illustrated embodiment, the unsafe condition signal 23 generates a red light. It should be understood that lights other than red or green can be associated with the safe and unsafe conditions and that no light emitted or a predetermined flashing pattern can be associated the unsafe or safe conditions.

Ready signal 22 and unsafe signal 23 are are important because they indicate when it is safe and when it is not safe for a driver to move a truck. It should be appreciated that signal 22 and signal 23 are each configured to indicate one of two predetermined states. A first state is associated with a safe or ready condition, i.e., the green light in the illustrated embodiment for signal 22. A second state is associated with an unsafe condition, i.e., off or no light emitted for signal 22. It is believed that in many facilities lights are positioned inside a facility to indicate when it is safe for facility workers to enter a trailer. It should be appreciated that the lights inside a facility indicate safe when the exterior lights indicate unsafe.

The period of time during which a truck is at a facility that includes loading dock includes several steps that might present hazards to people working at the facility or to the operator of a truck. In order to better understand when these hazards might occur and to determine what actions should be taken to reduce those hazards it is helpful to identify distinct stages that occur during the period of time a truck is at a facility. In this regard, a truck's dock sequence includes the following stages: 1) Arrival: the truck arrives at the loading dock and the driver is assigned a dock bay. 2) Entering dock bay: the ready signal 22 is lit green and it is safe for a truck to back into the bay. 3) Dock operations: loading, unloading, and inspection of goods on trailer— ready signal 22 is not illuminated and signal 23, the danger light, is illuminated red. 4) Departure—ready signal 22 is illuminated green and it is safe for the driver to prepare the truck for departure and to depart the dock.

Figure 1:
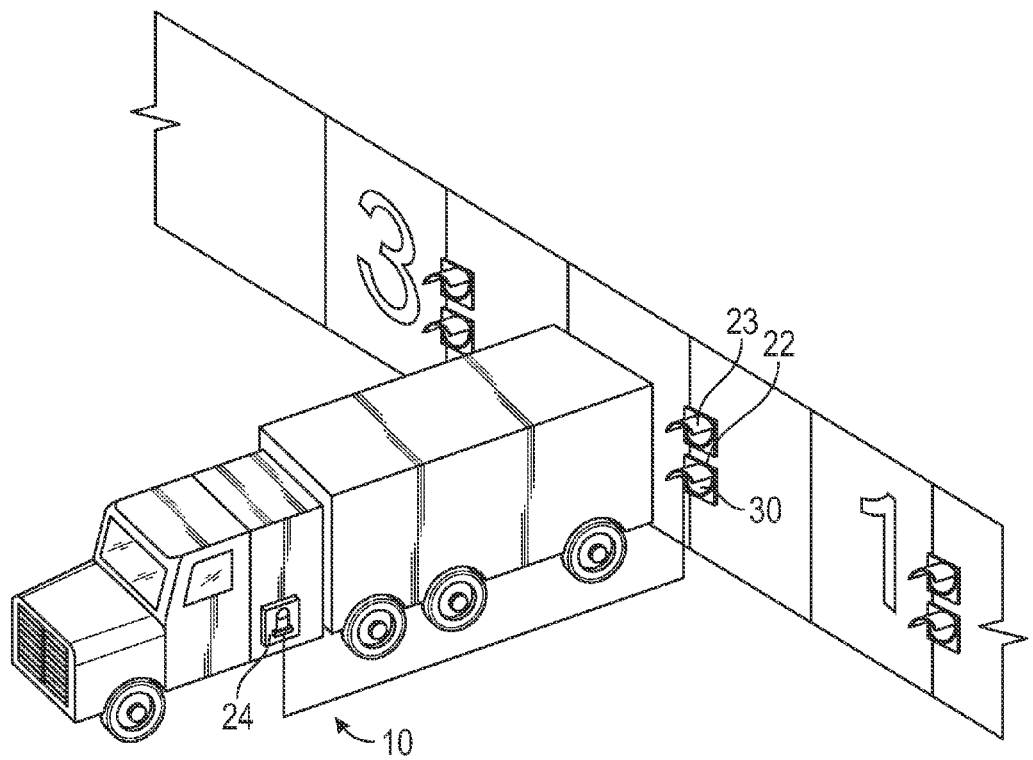
FIG. 1 is a perspective view showing a system for determining the status of a loading dock ready-light in use according to one embodiment of the present invention.

The present invention can be better understood by the following description of the operation thereof. System 10 is configured to be stored in cab 16. During the arrival stage 1), a driver arrives at a loading dock and checks in with loading dock crew, i.e. facility workers. At check-in, the driver is assigned a dock bay, as shown in FIG. 1, dock bay 2. It should be appreciated that cab 16 can be either parked while the driver checks in or the driver can remain in the cab and check-in with personnel that comes to the truck or remotely via telephone, radio, or other communication method. After checking in, entering stage 2 as described above begins. In this regard, the driver checks signal 22 of the assigned bay by observing it. If the bay is empty and ready to accept a truck, signal light 22 is green according to the illustrated embodiment, thus indicating that it is okay for the driver to back the trailer into that loading dock bay.

After the driver observes that signal 22 is green, the driver backs into the dock and parks the truck. The trailer is made safe in accordance with the requirements of the dock. By way of example and not limitation, this can include mechanically connecting the trailer to the dock, chocking the wheels of the trailer, and the like. The driver then positions detector 30 relative to signal light 22 such that detector 30 can be made operable to detect light emitted from signal light 22. Next, light 22 is electrically connected to interface 24 and indicator 26. In the illustrated embodiment, indicator 26 is an audible alarm. According to the illustrated embodiment, detector 30 is placed on signal 22 during the entering stage 2) and signal 22 is active. Therefore, the driver ensures that system 10 is in ready mode.

Because signal 22 can indicate safe in two stages, Entering stage 2 and Departure stage 4, system 10 can be set to one of two detection modes. One detection mode is referred to as a ready mode the other detection mode is referred to as a signal mode. When in ready mode, system 10 is configured such that no audible alarm is provided when light is detected by detector 30. In this regard, system 10 in ready mode is configured such that detector 30 can be positioned on signal 22 during the entering stage when signal 22 is green, without producing an audible signal.

When in signal mode, system 10 is configured such that an audible signal is provided when signal light 22 is indicating that it is okay for truck to depart. Such a signal would be misleading if generated when light 22 was green, but indicating that it was safe to enter the loading dock. System 10 is configured to switch automatically between ready mode and signal mode when signal 22 indicates green, then is off for a predetermined period of time. Because in some cases, signal 22 is configured to flash, i.e. alternate between emitting light and not emitting light in a repeating pattern, system 10 is configured to switch from ready mode when no light is detected from signal 22 for more than a predetermined time. In the illustrated embodiment, this dead-band is 10 seconds but can some other time that provides for correct identification of the state of signal 22, i.e. whether signal 22 is off or on.

When the operator hears the buzzer indicating that the signal is green and it is safe to depart, the driver silences the buzzer using the operator interface and switches system 10 off. Detector 30 and associated wiring is removed from signal 22 and placed within cab 16 such that it is ready to be used at the next loading dock.

In an alternative embodiment, system 10 does not include a ready mode and is configured such that a buzzer is always sounded when the light is on. In this embodiment, the buzzer sounds when detector 30 is placed on signal 22 and it is on during the entering mode and when signal 22 is on during departure mode. Thus in this embodiment, the driver must be aware of which stage the dock is in and act accordingly.

According to another alternative embodiment, the same light source is used to generate both the ready signal and the unsafe signal. In this embodiment, the light source is configured to generate at least two different conditions. For example, the light source could indicate the safe condition by generating a green light and the unsafe by generating a red light. In a similar embodiment, a single light source can be understood to indicate a safe condition when the light source is emitting light and understood to indicate an unsafe condition when the light source is not emitting light.

While the present invention has been illustrated and described with reference to preferred embodiments thereof, it will be apparent to those skilled in the art that modifications can be made and the Invention can be practiced in other environments without departing from the spirit and scope of the invention, set forth in the accompanying claims.

Having described the invention, the following is claimed:

1. A system for indicating the status of a loading dock to a driver, the system comprises:
   a signal detector that includes a photo-electric cell, and is configured to determine the status of as first signal generator and a second signal generator;
   an operator interface that is electrically connected to the signal detector; and
   wherein the operator interface is configured to convey to the operator the status determined by the signal detector and the signal detector is associated with a vehicle and is configured to be spaced-away from the vehicle, and is configured to be moved between the first signal generator and the second signal generator and the first signal generator includes a first light source and the signal detector is configured to detect light emitted from the first light source.

2. The system according to claim 1, wherein the signal detector is configured to be near the first light source.

3. The system according to claim 2, wherein the signal detector can be positioned such that it at least partially blocks light generated by the first signal generator.

4. The system according to claim 3, wherein the signal detector is configured to be supported by the first signal generator.

* * * * *